Nov. 1, 1938.  E. S. HARRISON  2,135,003
BRAKE SYSTEM
Filed Sept. 17, 1936
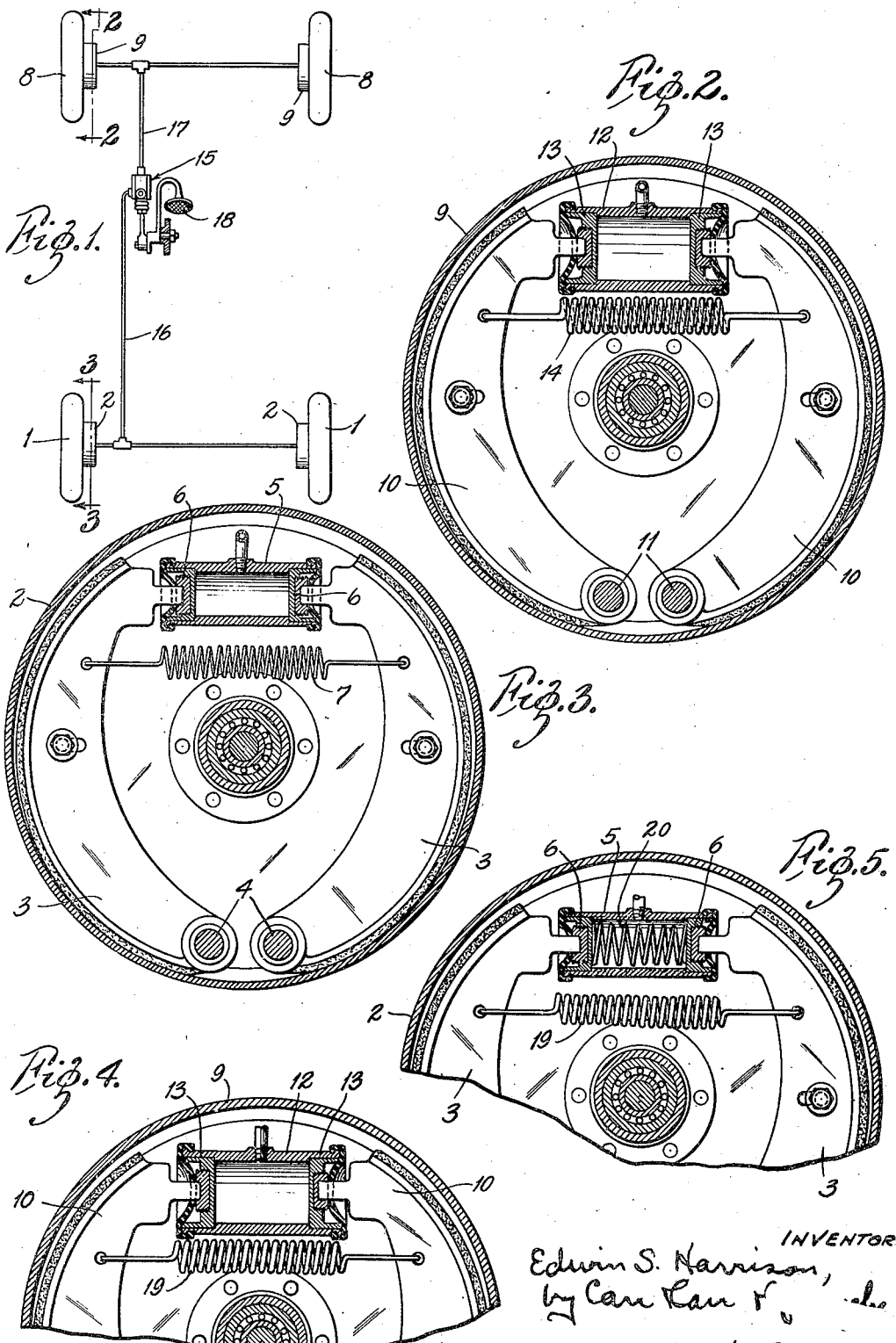
INVENTOR
Edwin S. Harrison, Patented Nov. 1, 1938

2,135,003

UNITED STATES PATENT OFFICE 2,135,003

BRAKE SYSTEM

Edwin S. Harrison, Clayton, Mo.; Margaret J. Harrison administratrix C. T. A. of the estate of said Edwin S. Harrison, deceased Application September 17, 1936, Serial No. 101,193

6 Claims. (Cl. 188—152)

This invention relates to four wheel brake systems for automotive vehicles. It has for its principal object to devise a simple and economical four wheel brake system which will apply the rear wheel brakes first but with a relatively light pressure for ordinary service stops (that is where the rate of deceleration is low) and will apply the front wheel brakes later but with a relatively heavy pressure for emergency or sudden stops, (that is where the rate of deceleration is high), and to equalize the wear on the linings of the lightly but more frequently applied rear wheel brakes and the linings of the heavily but less frequently applied front wheel brakes. The invention consists in the construction, combinations and arrangements of parts hereinafter described and claimed.

In the accompanying drawing, wherein like reference characters refer to like parts wherever they occur, Fig. 1 is a diagrammatic plan view of a four wheel automobile brake system embodying my invention;

Fig. 2 is a vertical cross section through the front axle on the line 2—2 in Fig. 1;

Fig. 3 is a similar cross section through the rear axle; and

Figs. 4 and 5 are fragmentary sections similar to Figs. 2 and 3, respectively, illustrating a modified form of the invention.

In the accompanying drawing, my invention is illustrated in connection with a four wheel, fluid operated brake system; but it is also applicable to mechanically operated four wheel brake systems. In accordance with common practice, each of the rear wheels 1 of the automotive vehicle is provided with the usual brake drum 2 and a brake consisting of a pair of arcuate shoes 3 pivotally supported at one end, as at 4, and adapted to be spread apart into engagement with the inner periphery of said drum by means of a relatively small fluid cylinder 5 interposed between the free ends of said shoes. The fluid cylinder 5 preferably contains two pistons 6 disposed in abutting relation to the free ends of the respective brake shoes 3. The brake shoes are normally held out of engagement with the brake drum 2 by a relatively weak tension spring 7 suitably connected at its opposite ends to the respective shoes.

Each of the front wheels 8 of the vehicle is also provided with the usual brake drum 9 and a brake comprising a pair of arcuate shoes 10 pivotally supported on one end, as at 11, and adapted to be spread apart into engagement with the inner periphery of said drum by means of a relatively large fluid cylinder 12 interposed between the free ends of said shoes and having a pair of pistons 13 therein disposed in abutting relation to said ends of said shoes. The brake shoes 10 are normally held out of engagement with the brake drum 9 by means of a relatively strong tension spring 14 having its ends secured to the respective brake shoes.

Fluid pressure from a single master cylinder 15 is supplied to the actuating cylinders 5 and 12 for the respective rear and front wheel brakes through suitable conduits 16 and 17, respectively. The piston (not shown) of the master cylinder 15 is actuated by means of a pedal 18 pivotally mounted on the vehicle and operatively connected in any suitable manner to said piston.

By the arrangement described, when the brake pedal 18 is actuated to apply the brakes, the pressure of the fluid between the pistons 6 in the relatively small rear wheel brake actuating cylinders 5 forces said pistons apart against the tension of the relatively light rear wheel brake retracting springs 7 and thus applies the rear wheel brakes, the retractive effort of the heavier front wheel disengaging springs 14 being sufficient to prevent such pressure from operating the pistons in the relatively large front wheel brake operating cylinders 12. Increased pressure on the operating pedal 18 gradually increases the pressure on the rear wheel brakes, until the fluid pressure in the relatively large front brake operating cylinders 12 overcomes the tension of the relatively heavy front wheel brake disengaging springs 14. Further pressure on the brake operating pedal gradually increases the pressure in the front brake shoe operating cylinders 12, which pressure, due to the greater piston area of the relatively large cylinders, finally exceeds the pressure of the rear brakes. The maximum front to back brake applying pressure ratio is dependent on the relative cylinder sizes and the relative retracting spring sizes.

The above described arrangement has several advantages. It brings about the application of the rear wheel brakes with a relatively light pressure prior to the application of the front wheel brakes and thus utilizes the rear wheel brakes for ordinary service stops. When, however, a sudden stop is required, continued pressure on the brake operating pedal 18 brings the front wheel brakes into action with a gradually increasing braking effort that finally exceeds the braking effort of the rear wheel brakes and thus decreasing the tendency of the rear wheel brakes to lock, thereby minimizing skidding of the vehicle when the weight thereof shifts forward and lessens the traction of the rear wheels. By using front and rear brake actuating cylinders of proper size and front and rear brake retracting springs of proper strength, the pressure ratio between the front and rear wheel brakes may be regulated so that the wear of the front wheel brakes, which are applied less frequently but with a relatively greater pressure, is substantially equal to the wear of the rear wheel brakes, which are applied more frequently but with a relatively lighter pressure.

In the modified construction shown in Figs. 4 and 5, the brakes for all four wheels are provided with brake shoe retracting springs 19 of substantially the same strength; and each of the relatively small rear wheel brake operating cylinders 5 has a compression spring 20 interposed between the two pistons 6 therein that is strong enough to substantially reduce the tension of the brake shoe retracting spring 19. By this arrangement, the springs 20 in the rear wheel brake cylinders 5 assist the fluid pressure in overcoming the tension of the brake shoe retracting springs 19 and thus causes the rear wheel brakes to be applied before the front wheel brakes. As the pressure of the fluid increases, the tension of the front wheel brake shoe retracting springs 19 is overcome and the front wheel brakes are applied with a pressure that gradually increases and finally exceeds the pressure of the rear wheel brakes due to the larger area of the front wheel brake operating cylinders 12. Obviously, the hereinbefore described brake system admits of considerable modification without departing from the invention. Thus, my invention has been described in connection with a brake system for use with motor vehicles of the common type wherein the load distribution is such that the greater weight is shifted to the front wheels at high rates of deceleration. It is contemplated, however, that in the case of trucks or other vehicles, there may be a different load distribution, such that the greater weight is always on the rear wheels, in which case the arrangement may be reversed, so as to brake first and lightly on the front wheels and subsequently to brake heavily on the rear wheels.

What I claim is:

1. A four wheel brake system comprising front and rear wheel brakes, retracting springs of substantially equal strength for the respective brakes, fluid cylinders for the respective brakes, the cylinders for the front wheel brakes being relatively large and the cylinders for the rear brakes being relatively small, springs in the actuating cylinders for the rear wheel brakes for reducing the retractive force of the retracting springs therefor below that of the front wheel brake retracting springs, and means for supplying fluid under pressure to said cylinders.

2. In a four wheel brake system, two pairs of brakes, retracting means for the individual brakes, means for actuating the individual brakes against the force of the retracting means therefor, and a common operating member for said brake actuating means, the retractive effort of the retracting means for one pair of brakes being sufficiently less than that of the retracting means for the other pair of brakes that said first mentioned pair of brakes will be applied prior to said other pair of brakes when said common operating member is actuated, the actuating means for said other pair of brakes being adapted when the movement of said common operating member is increased to apply said other pair of brakes with a braking effort that exceeds the maximum braking effort of said first mentioned pair of brakes.

3. A four wheel fluid actuated brake system including two pairs of brakes, retracting springs for the individual brakes, fluid cylinders for actuating the individual brakes against the force of the retracting springs therefor, and a master cylinder for controlling the pressure of the fluid in the individual brake actuating cylinders, the retractive effort of the springs of one pair of brakes being sufficiently less than that of the springs of the other pair of brakes that said first mentioned pair of brakes will be applied prior to said other pair of brakes under the same fluid pressure in said cylinders, the cylinders of said other pair of brakes being of larger effective cross-sectional area than the cylinders of said first mentioned pair of brakes, whereby when said master cylinder is actuated to increase pressure in said brake cylinders, said other pair of brakes will be applied with a braking effort that exceeds the maximum braking effort of said first mentioned pair of brakes.

4. A four wheel fluid actuated brake system including front and rear wheel brakes, retracting springs for the individual brakes, fluid cylinders for actuating the individual brakes against the force of the retracting springs therefor, and a master cylinder for controlling the pressure of the fluid in the individual brake actuating cylinders, the retractive effort of the springs of the rear wheel brakes being sufficiently less than that of the springs of the front wheel brakes that said rear wheel brakes will be applied prior to said front wheel brakes under the same fluid pressure in said cylinders, the cylinders of said front wheel brakes being of larger effective cross-sectional area than the cylinders of said rear wheel brakes, whereby when said master cylinder is actuated to increase the pressure in said brake cylinders, said front wheel brakes will be applied with a braking effort that exceeds the maximum braking effort of said rear wheel brakes.

5. A four wheel fluid actuated brake system including two pairs of brakes, retracting springs for the individual brakes, fluid cylinders for actuating the individual brakes against the force of the retracting springs therefor, and a master cylinder for controlling the pressure of the fluid in the brake actuating cylinders, the effective cross-sectional area of the cylinders of one pair of brakes being smaller than the cylinders of the other pair of brakes, whereby said other pair of brakes will be applied with a pressure greater than said first mentioned pair of brakes under the same fluid pressure, the retracting springs for said other pair of brakes actuated by the larger cylinders being strong enough to prevent operation of said other pair of brakes by fluid pressure sufficient to operate the smaller cylinders for said first mentioned pair of brakes, whereby when said master cylinder is actuated to increase the fluid pressure in said cylinders the pair of brakes actuated by the smaller cylinders will be actuated first followed by the application with gradually increasing effort of the pair of brakes actuated by the larger cylinders.

6. A four wheel fluid actuated brake system including front and rear wheel brakes, retracting springs for the individual brakes, fluid cylinders for actuating the individual brakes against the force of the retracting springs therefor, and a master cylinder for controlling the pressure of the fluid in the brake actuating cylinders, the effective cross-sectional area of the cylinders of said rear wheel brakes being smaller than the cylinders of said front wheel brakes, whereby said front wheel brakes will be applied with a pressure greater than said rear wheel brakes under the same fluid pressure, the retracting springs for said front wheel brakes actuated by the larger cylinders being strong enough to prevent operation of said front wheel brakes by fluid pressure sufficient to operate the smaller cylinders for said rear wheel brakes, whereby when said master cylinder is actuated to increase the fluid pressure in said cylinders the rear wheel brakes actuated by the smaller cylinders will be actuated first followed by the application with gradually increasing effort of the front wheel brakes actuated by the larger cylinders.

EDWIN S. HARRISON.